United States Patent
Jang et al.

(10) Patent No.: US 12,542,273 B2
(45) Date of Patent: Feb. 3, 2026

(54) ANODE ACTIVE MATERIAL FOR LITHIUM SECONDARY BATTERY AND LITHIUM SECONDARY BATTERY INCLUDING THE SAME

(71) Applicant: SK On Co., Ltd., Seoul (KR)

(72) Inventors: Hwan Ho Jang, Daejeon (KR); Moon Sung Kim, Daejeon (KR); Hyo Mi Kim, Daejeon (KR); Sang Baek Ryu, Daejeon (KR); Da Hye Park, Daejeon (KR); Eun Jun Park, Daejeon (KR); Seung Hyun Yook, Daejeon (KR); Da Bin Chung, Daejeon (KR); Jun Hee Han, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 18/462,432

(22) Filed: Sep. 7, 2023

(65) Prior Publication Data

US 2024/0120465 A1    Apr. 11, 2024

(30) Foreign Application Priority Data

Oct. 4, 2022    (KR) .................. 10-2022-0126400

(51) Int. Cl.
*H01M 4/36*    (2006.01)
*H01M 4/02*    (2006.01)
(Continued)

(52) U.S. Cl.
CPC .......... *H01M 4/364* (2013.01); *H01M 4/131* (2013.01); *H01M 4/133* (2013.01); *H01M 4/134* (2013.01);
(Continued)

(58) Field of Classification Search
CPC ...... H01M 4/364; H01M 4/131; H01M 4/133; H01M 4/134; H01M 4/136; H01M 4/366;
(Continued)

(56) References Cited

U.S. PATENT DOCUMENTS

2017/0149059 A1*    5/2017    Dutta .................... H01M 4/134
2018/0090750 A1*    3/2018    Oh ........................ H01M 4/483
(Continued)

FOREIGN PATENT DOCUMENTS

CN    109904447 B    2/2022
EP    3675249 A1    7/2020
(Continued)

OTHER PUBLICATIONS

Partial European Search Report for the European Patent Application No. 23199480.7 issued by the European Patent Office on Mar. 22, 2024.
(Continued)

*Primary Examiner* — Eugenia Wang
(74) *Attorney, Agent, or Firm* — IP & T GROUP LLP (57) ABSTRACT

An anode active material for a secondary battery includes a carbon-based active material, and silicon-based active material particles doped with magnesium. At least some of the silicon-based active material particles include pores, and a volume ratio of pores having a diameter of 50 nm or less among the pores is 2% or less based on a total volume of the silicon-based active material particles.

13 Claims, 3 Drawing Sheets

(51) Int. Cl.
  *H01M 4/131* (2010.01)
  *H01M 4/133* (2010.01)
  *H01M 4/134* (2010.01)
  *H01M 4/136* (2010.01)
  *H01M 4/38* (2006.01)
  *H01M 4/485* (2010.01)
  *H01M 4/58* (2010.01)
  *H01M 4/583* (2010.01)
  *H01M 10/0525* (2010.01)

(52) U.S. Cl.
  CPC .......... *H01M 4/136* (2013.01); *H01M 4/366* (2013.01); *H01M 4/386* (2013.01); *H01M 4/485* (2013.01); *H01M 4/58* (2013.01); *H01M 4/583* (2013.01); *H01M 2004/021* (2013.01); *H01M 2004/027* (2013.01); *H01M 10/0525* (2013.01)

(58) Field of Classification Search
  CPC ........ H01M 4/386; H01M 4/485; H01M 4/58; H01M 4/583; H01M 10/0525; H01M 2004/021; H01M 2004/027
  See application file for complete search history.

(56) References Cited

U.S. PATENT DOCUMENTS

| | | | |
|---|---|---|---|
| 2020/0335795 A1* | 10/2020 | Cha | H01M 4/623 |
| 2020/0350571 A1* | 11/2020 | Lee | H01M 4/386 |
| 2021/0028438 A1* | 1/2021 | Lee | H01M 4/133 |
| 2021/0151744 A1* | 5/2021 | Choi | H01M 4/134 |
| 2022/0149354 A1* | 5/2022 | Omura | H01M 4/366 |
| 2022/0271289 A1* | 8/2022 | Lee | H01M 4/1391 |

FOREIGN PATENT DOCUMENTS

| | | | | |
|---|---|---|---|---|
| EP | 4328994 A1 | 2/2024 | | |
| JP | 2016-164884 A | 9/2016 | | |
| KR | 20050087148 A | 8/2005 | | |
| KR | 10-2017-0099748 A | 9/2017 | | |
| KR | 10-2019-0061013 A | 6/2019 | | |
| KR | 10-2019-0140610 A | 12/2019 | | |
| KR | 10-2021-0094685 A | 7/2021 | | |
| WO | WO-2020175506 A1 * | 9/2020 | ............ | C01G 53/44 |
| WO | 2022065846 A1 | 3/2022 | | |

OTHER PUBLICATIONS

Extended European Search Report for the European Patent Application No. 23199480.7 issued by the European Patent Office on Sep. 6, 2024.

* cited by examiner

ANODE ACTIVE MATERIAL FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims priority to Korean Patent Application No. 10-2022-0126400 filed on Oct. 4, 2022 in the Korean Intellectual Property Office (KIPO), the entire disclosure of which is incorporated by reference herein.

BACKGROUND

1. Field

The disclosure of the present application relates to an anode active material for a lithium secondary battery and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Additionally, a battery pack including the secondary battery is being developed and applied as a power source for eco-friendly vehicles such as a hybrid vehicle.

Examples of the secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc. Thus, the lithium secondary battery is being developed and applied as a power source for eco-friendly vehicles such as a hybrid vehicle.

For example, the lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

For example, the anode may include a carbon-based active material or silicon-based active material particles as an anode active material. The silicon-based active material may have a high energy density, but active material particles may contract/expand when charging/discharging is repeated. Accordingly, a poor contact between active material particles and a short circuit may occur. If a composition and a structure of the anode active material are changed to improve stability of the active material particles, ionic conductivity and high-temperature stability may be degraded and a power and a life-span of the secondary battery may be deteriorated.

SUMMARY

According to an aspect of the present invention, there is provided an anode active material for a lithium secondary battery having improved stability and electrical property.

According to an aspect of the present invention, there is provided a lithium secondary battery having improved stability and electrical property.

An anode active material for a lithium secondary battery includes a carbon-based active material, and silicon-based active material particles doped with magnesium. At least some of the silicon-based active material particles include pores, and a volume ratio of pores having a diameter of 50 nm or less among the pores is 2% or less based on a total volume of the silicon-based active material particles.

In some embodiments, a volume fraction of particles having a particle diameter of 2 μm or less among the silicon-based active material particles may be 15% or less.

In some embodiments, a volume fraction of particles having a particle diameter of 1 μm or less among the silicon-based active material particles may be 7.5% or less.

In some embodiments, a specific surface area of the silicon-based active material particles may be 10.5 $m^2/g$ or less.

In some embodiments, the volume ratio of the pores having a diameter of 50 nm or less may be in a range from 0.2% to 2% based on the total volume of the silicon-based active material particles.

In some embodiments, a content of magnesium doped in the silicon-based active material particles may be greater than 0 wt % and less than 25 wt % based on a total weight of the silicon-based active material particles.

In some embodiments, wherein the silicon-based active material particles may further include a carbon coating.

In some embodiments, the silicon-based active material particles may be further doped with at least one element selected from the group consisting of Li, Al, Ca, Fe, Ti, Zn, La, Ce, Sn, Zr and Ru.

In some embodiments, in a Mg1s spectrum of the silicon-based active material particles measured by an X-ray photoelectron spectroscopy (XPS), a ratio of a peak area of 1303 eV relative to a sum of a peak area of 1304.5 eV and the peak area of 1303 eV may be 0.6 or less.

In some embodiments, a content of magnesium hydroxide present on surfaces of the silicon-based active material particles may be 0.05 wt % or less based on a total weight of the silicon-based active material particles.

In some embodiments, a content of the silicon-based active material particles may be in a range from 0.1 wt % to 30 wt % based on a total weight of the anode active material.

In some embodiments, a content of the carbon-based active material may be in a range from 60 wt % to 99 wt % based on a total weight of the anode active material.

An anode active material for a lithium secondary battery includes a carbon-based active material including artificial graphite and natural graphite, and silicon-based active material particles doped with magnesium. A volume fraction of particles having a particle diameter of 2 μm or less among the silicon-based active material particles is 15% or less, and a content of artificial graphite is greater than a content of natural graphite.

In some embodiments, a ratio of the content of natural graphite relative to the content of artificial graphite may be 0.5 or less.

In some embodiments, at least some of the silicon-based active material particles may include pores, and a volume of pores having a diameter of 50 nm or less among the pores may be 2% or less based on the total volume of the silicon-based active material particles.

An anode for a lithium secondary battery includes an anode current collector, and an anode active material layer formed on the anode current collector. The anode active material layer includes the anode active material according to the above-described embodiments.

In some embodiments, a coating layer may be disposed between the anode current collector and the anode active material layer. The anode material layer and the coating layer may each include a binder, and a content of the binder included in the coating layer may be greater than a content of the binder included in the anode active material layer. In some embodiments, the coating layer may further include the anode active material.

A lithium secondary battery includes the anode for a lithium secondary battery according to the above-described embodiments, and a cathode facing the anode for the lithium secondary battery.

An anode active material according to embodiments of the present disclosure includes a carbon-based active material to have improved high-temperature life-span properties and electrochemical stability, and includes a silicon-based active material to provide increased energy density and charge/discharge capacity. Additionally, magnesium is doped into the silicon-based active material, so that contraction and expansion of particles may be suppressed, and rapid charging and life-span properties at room temperature may be improved.

A volume fraction of particles having a particle diameter of 2 μm or less in the silicon-based active material may be adjusted within a desired range. Side reactions and structural defects of the anode active material may be prevented, and capacity retention and high-temperature stability of the secondary battery may be improved.

The silicon-based active material may have a porous structure, and a volume ratio of pores formed in the silicon-based active material may be controlled within a desired range. Cracks and volume expansion of the anode active material during charging and discharging may be prevented, and the life-span properties of the secondary battery may be further improved.

The carbon-based active material may include artificial graphite and natural graphite, and the life-span and high-temperature operational stability of the secondary battery may be improved.

DETAILED DESCRIPTION OF THE EMBODIMENTS

An anode active material according to embodiments of the present disclosure includes a carbon-based active material and a silicon-based active material doped with magnesium. Additionally, a lithium secondary battery including the anode active material is provided.

Hereinafter, embodiments of the present disclosure invention will be described in detail. However, those skilled in the art will appreciate that such embodiments described are provided to further understand the spirit of the present inventive concepts disclosed herein, do not limit subject matters to be protected as disclosed in the detailed description and appended claims.

An anode active material for a secondary battery according to example embodiments includes a carbon-based active material and a silicon-based active material. For example, the anode active material may be a mixture in which a carbon-based active material and a silicon-based active material are uniformly blended/dispersed.

The silicon-based active material may be doped with magnesium (Mg). In an embodiment, the silicon-based active material may include magnesium-doped silicon-based active material particles (e.g., silicon oxide particles).

For example, when magnesium is doped into the silicon-based active material particles, magnesium may be bonded to the silicon-based active material particles to form a magnesium silicate region in at least a portion of the silicon-based active material particle through an irreversible reaction. For example, the magnesium silicate may be present at an inside and/or on a surface of the particle. Accordingly, an initial irreversible reaction occurring during charging and discharging of the battery may be prevented, and an initial efficiency of the lithium secondary battery may be improved.

Further, magnesium is doped so that contraction and expansion of the particles may be reduced, and cracks and a short circuit caused by a stress may be suppressed. Accordingly, rapid charge life-span and room temperature life-span properties of the lithium secondary battery may be improved.

In some embodiments, a content of magnesium doped in the silicon-based active material particles may be greater than 0 weight percent (wt %) and less than 25 wt % based on a total weight of the silicon-based active material particles. For example, the content of doped magnesium can be measured using an inductively coupled plasma (ICP).

If the content of magnesium doped in the silicon-based active material exceeds 25 wt %, an activity of the anode active material may be relatively reduced due to the relatively reduced silicon content, and initial charge/discharge capacity and power properties may be degraded.

In an embodiment, the content of magnesium doped in the silicon-based active material particles may be in a range from 5 wt % to 17 wt % based on the total weight of the silicon-based active material particles. Within this range, the high activity of the anode active material may be maintained while further improving structural stability and life-span properties.

In some embodiments, a Mg1s spectrum measured by an X-ray photoelectron spectroscopy (XPS) for the silicon-based active material particles may have peaks at 1304.5 eV and 1303 eV.

For example, in the Mg1s spectrum measured through the XPS analysis, a 1304.5 eV peak corresponds to magnesium oxide (Mg Oxide), and a 1303 eV peak corresponds to magnesium (Mg Metal).

In an embodiment, in the Mg1s spectrum of the silicon-based active material particles measured through the XPS analysis, a ratio of an area of the 1303 eV peak relative to a sum of areas of the 1304.5 eV peak and the 1303 eV peak may be 0.6 or less.

For example, the ratio of the area of the 1303 eV peak relative to the sum of areas of the 1304.5 eV peak area and the 1303 eV peak area may be 0.4 or less, or may be in a range from 0.01 to 0.4.

Within the above range, the magnesium silicate region may be increased in the silicon-based active material particle, and the initial irreversible reaction of the silicon-based active material during intercalation and desorption of lithium ions may be suppressed. Thus, the initial efficiency of the lithium secondary battery may be improved.

Additionally, a content of magnesium hydroxide present on the surface of the silicon-based active material may be reduced within the peak area range, thereby preventing a gas generation and a reduction of power due to side reactions.

For example, magnesium may remain on the surface of the silicon-based active material particle while doping the silicon-based active material particle with magnesium. Magnesium remaining on the surface of the silicon-based active material particle may exist in the form of magnesium hydroxide. In this case, the metal hydroxide may react with water to form hydroxide ions (OH$^-$), so that a pH of an anode slurry may be increased. Accordingly, a thickener included in the anode slurry may be contracted, and a viscosity of the anode slurry may decrease, thereby reducing processability and productivity of an electrode fabrication.

The hydroxide ions may react with the silicon-based active material to generate a hydrogen gas. Accordingly, a reversible silicon may be converted into an irreversible silicon oxide (e.g., $SiO_2$) to deteriorate capacity properties of the anode active material.

In example embodiments, a content of magnesium hydroxide may be 0.05 wt % or less, or 0.01 wt % or less base on the total weight of the silicon-based active material. In an embodiment, magnesium hydroxide may not remain on the surface of the silicon-based active material.

Thus, the reaction of the hydroxide ions formed from the metal hydroxide with the silicon-based active material may be suppressed. Accordingly, a pH increase of the anode slurry and generation of the hydrogen gas may be suppressed, and the power/capacity and life-span properties may be enhanced while preventing reduction of the initial capacity efficiency.

In some embodiments, the silicon-based active material may be further doped with at least one of Li, Al, Ca, Fe, Ti, Zn, La, Ce, Sn, Zr and Ru.

For example, when a lithium (Li) element is further doped, a lithium silicate region may be formed in at least a portion of the silicon-based active material particle. For example, lithium silicate may be present at an inside and/or on the surface of silicon-based active material particle.

A volume fraction of particles having a particle diameter of 2 µm or less may be 15% or less among the silicon-based active material particles.

A particle diameter of the silicon-based active material particles can be measured using a scanning electron microscope (SEM), a transmission electron microscope (TEM) or a light scattering method. The term "particle diameter" as used herein may refer to the longest diameter of any particle.

For example, a volumetric particle size distribution of the silicon-based active material particles may be measured using a particle size analyzer using a light scattering method, and a particle diameter at 15% of the volume fraction when accumulated in an ascending order may be 2 µm or more.

For example, when a content of fine particles having a small particle size is high, a contact area of the anode active material may be excessively increased, and the side reactions and the gas generation may be promoted to deteriorate the high-temperature life-span properties. Further, when active material particles have a small size, mechanical properties of the particles may be degraded. Accordingly, cracks may occur on the surface and at the inside of the particles during charging and discharging of the battery, and the contact between particles may become poor due to expansion of the particles.

In example embodiments, the silicon-based active material includes a small amount of the particles having the particle size of 2 µm or less, so that the initial efficiency of the secondary battery may be improved. Additionally, expansion and contraction of the active material during charging and discharging may be reduced, and thus power and high-temperature life-span properties of the secondary battery may be improved.

In an embodiment, the volume fraction of the particles having the particle diameter of 2 µm or less may be 10% or less, e.g., 5% or less among the silicon-based active material particles.

In some embodiments, a volume fraction of the silicon-based active material particles having a particle diameter of 1 µm or less among the silicon-based active material particles may be 7.5% or less. In an embodiment, the volume fraction of the particles having a particle diameter of 1 µm or less among the particles of the silicon-based active material particles may be 5% or less.

For example, the silicon-based active material may not include particles having a particle size of 1 µm or less, or may not include particles having a particle size of less than 2 µm.

In an embodiment, a minimum particle diameter (Dmin) of the silicon-based active material particles may be greater than 0.3 µm, greater than 1 µm, or 2 µm or greater. For example, the minimum particle diameter of the silicon-based active material particles may be in a range from 2 µm to 3 µm. Accordingly, the side reactions due to the contact between the silicon-based active material and the electrolyte may be further suppressed, and the life-span properties of the secondary battery may be further improved by an implementation of a reversible charge/discharge behavior.

The minimum particle diameter (Dmin) may refer to the smallest particle diameter measured using a laser diffraction particle size analyzer after dispersing the silicon-based active material in a dispersion medium.

Figure 3:
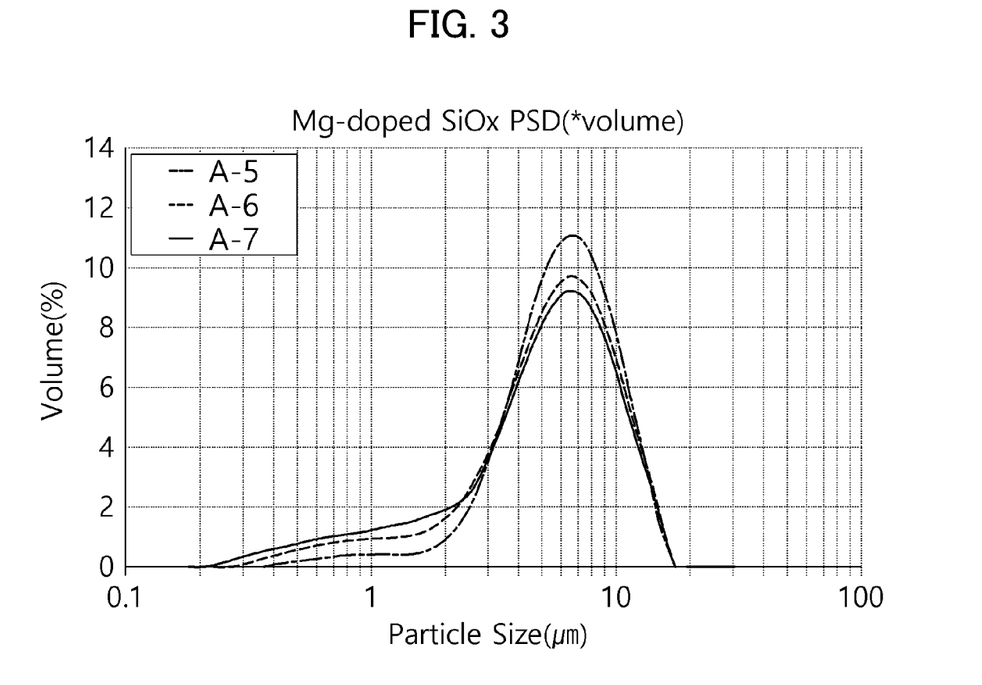
FIGS. 3 and 4 are graphs showing a volumetric particle size distribution and a volumetric cumulative particle size distribution, respectively, of silicon-based active materials according to Preparation Example.
Figure 4:
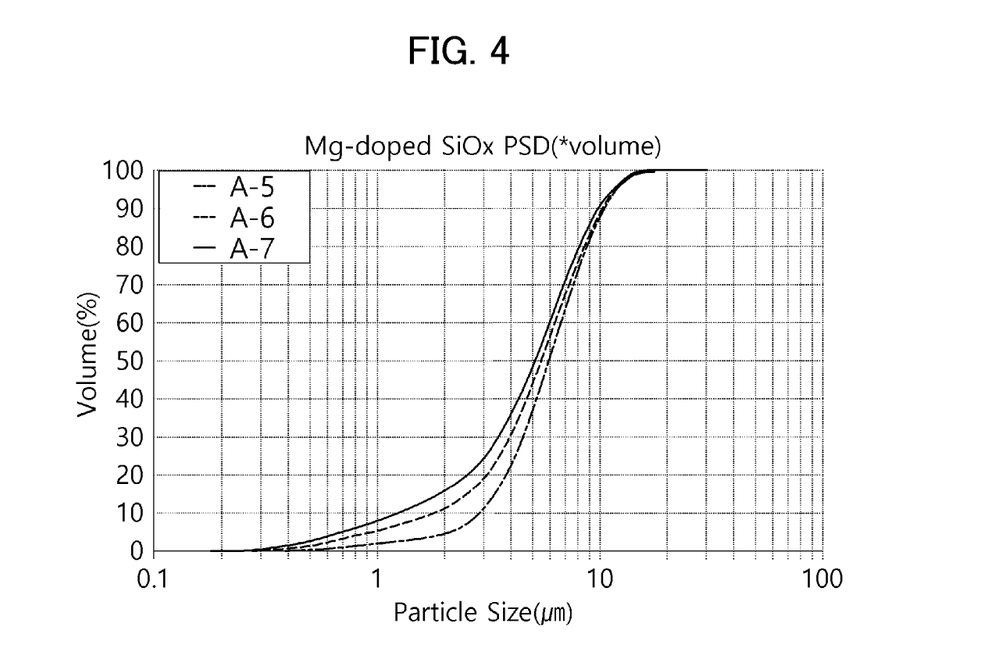

FIGS. 3 and 4 are graphs showing a volumetric particle size distribution and a volumetric cumulative particle size distribution, respectively. For example, in FIGS. 3 and 4, the minimum particle diameter (Dmin) may be designated as an X-intercept of a particle size distribution curve.

At least some of the silicon-based active material particles may include pores. For example, at least some of the particles may have pores on the surface and at an inside thereof. For example, the silicon-based active material particles may have a porous structure.

Therefore, expansion of the active material particles during charging and discharging may be suppressed, and mechanical properties and structural stability may be improved by relieving a stress acting on the particles. Additionally, the contact area between the active material particles may be increased so that a conductivity of the anode active material may be enhanced.

In some embodiments, a volume ratio of pores having a diameter of 50 nm or less among the pores may be 2% or less based on a total volume of the silicon-based active material particles. For example, the pore volume ratio may be a percentage of a value obtained by dividing a total volume of the pores having a diameter of 50 nm or less by the total volume of silicon-based active material particles.

The total volume of pores can be measured by a Brunauer-Emmett-Teller (BET) method. The total volume of the silicon-based active material particles can be calculated by dividing the total weight of the of the silicon-based active material particles by a true density of the silicon-based active material particles.

In some embodiments, the volume ratio of the pores may be in a range from 0.2% to 2%, e.g., from 0.5% to 1.7%. If the volume ratio of the pores is greater than 2%, the structural stability and high-temperature life-span properties may be deteriorated. If the volume ratio of the pores is less than 0.2%, the room temperature life-span and power properties may be relatively deteriorated.

The silicon-based active material may have a specific surface area of 10.5 $m^2/g$ or less. For example, the specific surface area of the silicon-based active material may be in a range from 1.0 $m^2/g$ to 10.5 $m^2/g$, or from 4.0 $m^2/g$ to 10 $m^2/g$. The specific surface area can be measured by the BET method.

Within the above-described specific surface area range, the side reactions during charging and discharging may be efficiently suppressed, and irreversible decomposition of the electrolyte and resistance increase may be prevented. Thus, capacity characteristics and cycle properties of the secondary battery may be improved.

In some embodiments, the silicon-based active material particles may further include a carbon coating.

In some embodiments, the carbon coating may be formed by a thermal decomposition of an organic material in a non-oxidizing atmosphere. For example, the carbon coating may be formed by a chemical vapor deposition (CVD) of an organic material on the surface of the silicon-based active material under an atmosphere of gas and/or vapor.

The organic material may include a hydrocarbon-based material or an aromatic hydrocarbon-based material such as methane, ethane, ethylene, acetylene, propane, butane, butene, pentane, isobutane, hexane, cyclohexane, benzene, toluene, xylene, styrene, ethylbenzene, diphenylmethane, naphthalene, phenol, cresol, nitrobenzene, chlorobenzene, indene, coumarone, pyridine, anthracene, phenanthrene, etc. These may be used alone or in a combination thereof.

In some embodiments, a content of the carbon coating may be in a range from 1 wt % to 12 wt % based on the total weight of the silicon-based active material particles. Within the above range, appropriate conductivity may be provided with the anode active material, and the anode having improved uniformity may be obtained without causing the gas generation when preparing the anode slurry.

In an embodiment, the silicon-based active material may further include an active material devoid of a magnesium doping.

For example, the silicon-based active material may further include silicon (Si), a silicon oxide (SiOx, 0<x<2), a silicon-metal alloy, or a silicon-carbon composite (Si—C). These may be used alone or in combination thereof.

The silicon oxide (SiOx, 0<x<2) may contain a lithium compound. For example, the SiOx containing the lithium compound may be an SiOx pretreated with lithium. For example, the SiOx containing the lithium compound may include lithium silicate.

In some embodiments, the silicon-carbon composite may include silicon carbide (SiC) in which silicon and carbon mechanically forms an alloy, or silicon-carbon particles having a core-shell structure.

In example embodiments, a content of the silicon-based active material may be in a range from 0.1 wt % to 30 wt % based on a total weight of the anode active material. If the content of the silicon-based active material exceeds 30 wt %, cracks and the short circuit may occur due to an expansion of the anode active material. If the content of the silicon-based active material is less than 0.1 wt %, the content of the silicon-based active material may be reduced relatively to the content of the carbon-based active material, and initial efficiency and charging rate of the secondary battery may be lowered.

In an embodiment, the content of the silicon-based active material may be in a range from 2 wt % to 20 wt %, e.g., from 2 wt % to 15 wt % based on the total weight of the anode active material.

In example embodiments, the carbon-based active material may include artificial graphite. Artificial graphite may provide a lower capacity than that from natural graphite, but may have relatively high chemical and thermal stability. Accordingly, high-temperature storage or high-temperature life-span properties of the secondary battery may be improved.

In some embodiments, the carbon-based active material may further include natural graphite. Activity and capacity from the anode active material can be further enhanced by natural graphite.

In an embodiment, the carbon-based active material may include both artificial graphite and natural graphite. In this case, a content of artificial graphite may be greater than that of natural graphite. Accordingly, high-temperature stability may be improved while enhancing charge/discharge capacity and power properties of the anode active material.

In an embodiment, a ratio of the content of natural graphite relative to the content of artificial graphite may be 0.5 or less, e.g., in a range from 0.01 to 0.5. Within the above range, the anode active material may provide a high energy density, while proving enhanced life-span properties.

In an embodiment, the carbon-based active material may further include an amorphous-based active material such as hard carbon, soft carbon, calcined coke, mesophase pitch carbide, etc. These may be used alone or in combination thereof.

In example embodiments, the content of the carbon-based active material may be in a range from 60 wt % to 99 wt %, e.g., in a range from 75 wt % to 98 wt % based on the total weight of the anode active material. If the content of the carbon-based active material is less than 60 wt %, the short circuit may occur in the electrode, thereby reducing life-span and capacity recovery of the secondary battery. If the content of the carbon-based active material exceeds 99 wt %, the content of the silicon-based active material may be reduced, and the capacity and energy density of the secondary battery may be lowered.

Figure 1:
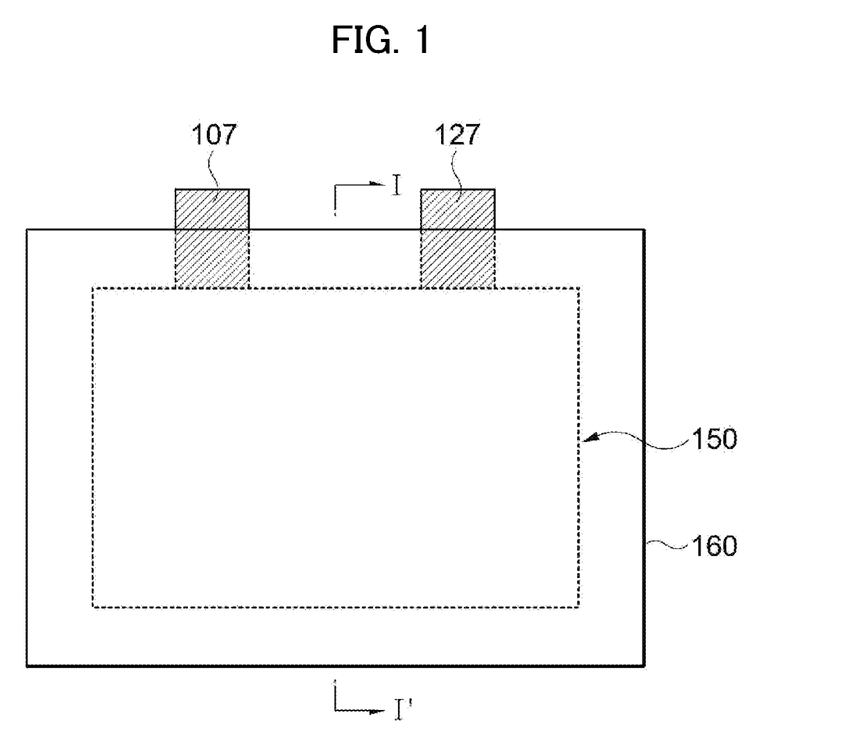
FIG. 1 is a schematic plan view illustrating a secondary battery in accordance with example embodiments.
Figure 2:
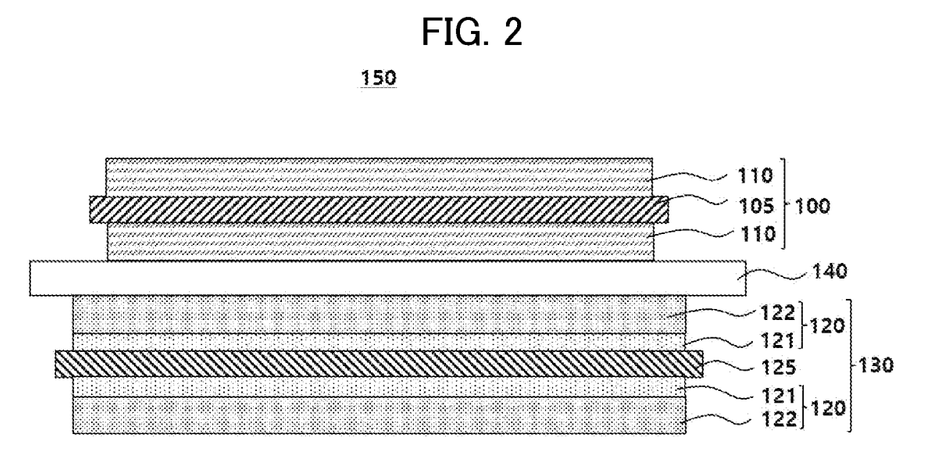
FIG. 2 is a schematic cross-sectional view illustrating an electrode assembly in accordance with example embodiments.

FIGS. 1 and 2 are a schematic plan view and a schematic cross-sectional view, respectively, illustrating a secondary battery according to exemplary embodiments. For example, FIG. 2 is a cross-sectional view of a lithium secondary battery taken along a line I-I' of FIG. 1.

For convenience of descriptions, illustrations of a cathode and an anode are omitted in FIG. 1.

Referring to FIGS. 1 and 2, the secondary battery may be provided as a lithium secondary battery. In example embodiments, the secondary battery may include an electrode assembly 150 and a case 160 accommodating the electrode assembly 150. The electrode assembly 150 may include an anode 100, a cathode 130 and a separator 140.

The cathode 100 may include a cathode current collector 105 and a cathode active material layer 110 formed on at least one surface of the cathode current collector 105. In example embodiments, the cathode active material layer 110 may be formed on both surfaces (e.g., upper and lower surfaces) of the cathode current collector 105. For example, the cathode active material layer 110 may be coated on the upper and lower surfaces of the cathode current collector 105, and may be directly coated on the surface of the cathode current collector 105.

The cathode current collector 105 may include, e.g., stainless steel, nickel, aluminum, titanium, copper, or an alloy thereof, and may include, e.g., aluminum or an aluminum alloy.

The cathode active material layer 110 may include a lithium metal oxide as a cathode active material. In example embodiments, the cathode active material layer 110 may include a lithium (Li)-nickel (Ni)-based oxide according to example embodiments.

In some embodiments, the lithium metal oxide included in the cathode active material layer 110 may be represented by Chemical Formula 1 below.

[Chemical Formula 1]

In Chemical Formula 1, $-0.05 \leq a \leq 0.15$, $0.01 \leq x \leq 0.2$, $0 \leq y \leq 0.2$ and M may include at least one selected from the group consisting of Mn, Mg, Sr, Ba, B, Al, Si, Ti, Zr and W. In an embodiment, $0.01 \leq x \leq 0.20$ and $0.01 \leq y \leq 0.15$.

In an embodiment, in Chemical Formula 1, M may include manganese (Mn). In this case, a nickel-cobalt-manganese (NCM)-based lithium oxide may be used as the cathode active material.

For example, nickel (Ni) may serve as a metal related to the capacity of the lithium secondary battery. As the nickel content become greater, the capacity and power of the lithium secondary battery may also increase. However, when the nickel content is excessively increased, the life-span may be reduced, and mechanical and electrical stability may be degraded. For example, cobalt (Co) may be a metal related to a conductivity or resistance of a lithium secondary battery. For example, manganese (Mn) may serve as a metal related to mechanical and electrical stability of the lithium secondary battery.

Capacity, power, low resistance and life-span stability of the cathode active material layer 110 may be improved together through the above-described interaction between nickel, cobalt and manganese.

For example, a cathode slurry may be prepared by mixing and stirring the cathode active material with a binder, a conductive material and/or a dispersive agent in a solvent. The cathode slurry may be coated on the cathode current collector 105, and then dried and pressed (rolled) to form the cathode active material layer 110.

For example, the binder may include vinylidene fluoride-hexafluoropropylene copolymer (PVDF-co-HFP), polyvinylidenefluoride (PVDF), polyacrylonitrile, polymethyl methacrylate, polyvinylalcohol, polyvinylpyrrolidone, polyethylene, polypropylene, polyacrylic acid, styrene-butadiene rubber (SBR), etc., and a thickener such as carboxymethyl cellulose (CMC) may be used together.

For example, a PVDF-based binder may be used as a binder for forming the cathode. In this case, an amount of the binder for forming the cathode active material layer 110 may be reduced, and an amount of the cathode active material or lithium metal oxide particles may be relatively increased. Thus, the power and capacity properties of the secondary battery may be improved.

For example, the conductive material may include a carbon-based conductive material such as graphite, carbon black, carbon nanofiber, carbon nanotube, and/or a metal-based conductive material such as tin, tin oxide, zinc oxide, titanium oxide, a metal fiber, etc.

In some embodiments, an electrode density of the cathode 100 may be in a range from 3.0 g/cc to 3.9 g/cc, for example, from 3.2 g/cc to 3.8 g/cc.

The anode 130 may include an anode current collector 125 and an anode active material layer 122 formed on at least one surface of the anode current collector 125. In example embodiments, the anode active material layer 122 may be formed on both surfaces (e.g., upper and lower surfaces) of the anode current collector 125. The anode active material layer 122 may be coated on each of the upper and lower surfaces of the anode current collector 125. For example, the anode active material layer 122 may directly contact the surface of the anode current collector 125.

The anode current collector 125 may include gold, stainless steel, nickel, aluminum, titanium, copper or an alloy thereof, and may include, e.g., copper or a copper alloy.

In some embodiments, an anode composition including the above-described anode active material may be coated on the anode current collector 125, and then dried and pressed (rolled) to form the anode active material layer 122.

The anode composition may be provided in a slurry form and may include the anode active material, a binder, a conductive material, and a thickener. Materials substantially the same as or similar to materials used for the cathode 100 may also be used as the binder and the conductive material for the anode.

In some embodiments, the binder for forming the anode 130 may include, e.g., styrene-butadiene rubber (SBR) or an acrylic binder for compatibility with the graphite-based active material, and carboxymethyl cellulose (CMC) may also be used as the thickener.

In example embodiments, the anode 130 may further include a coating layer 121 disposed between the anode current collector 125 and the anode active material layer 122. For example, the coating layer 121 may be formed by coating and drying a composition for forming the coating layer on the anode current collector 125, and then the anode active material layer 122 may be formed on the coating layer 121.

In some embodiments, the composition for forming the coating layer may include a binder. For example, the composition for forming the coating layer may include the same binder as that included in the anode composition.

In an embodiment, a content (wt %) of the binder included in the coating layer 121 may be greater than that of the binder included in the anode active material layer 122. A region adjacent to the anode current collector 125 has a relatively high binder content, so that detachment and short-circuit of the anode active material layer 122 may be prevented, and rapid charging and life-span properties may be further improved.

In some embodiments, the coating layer 121 may include the above-described anode active material. For example, the coating layer 121 may have an anode activity, and the anode active material layer 120 may have a substantially a multi-layered structure.

For example, the anode active material layer 120 may include a first anode active material layer 121 formed on the anode current collector 125 and a second anode active material layer 122 formed on the first anode active material layer 121.

The binder content of the first anode active material layer 121 adjacent to the anode current collector 125 may be higher than that of the second anode active material layer 122, so that the rapid charging and life-span properties may be improved.

In example embodiments, an electrode density of the anode 130 may be in a range from 1.0 g/cc to 1.9 g/cc.

In some embodiments, an area and/or a volume of the anode 130 (e.g., a contact area with the separator 140) may be greater than that of the cathode 100. Thus, lithium ions generated from the cathode 100 may be easily transferred to the anode 130 without a loss by, e.g., precipitation or sedimentation to further improve power and capacity of the secondary battery.

The separator 140 may be interposed between the cathode 100 and the anode 130. The separator 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, etc. The separator 140 may also include a non-woven fabric formed from a glass fiber with a high melting point, a polyethylene terephthalate fiber, etc.

The separator 140 may extend between the cathode 100 and the anode 130, and may be folded and wound along a thickness direction of the lithium secondary battery. Accordingly, a plurality of the anodes 100 and the cathodes 130 may be stacked in the thickness direction using the separator 140.

In example embodiments, an electrode cell may be defined by the cathode 100, the anode 130 and the separator 140, and a plurality of the electrode cells may be stacked to form the electrode assembly 150 that may have e.g., a jelly roll shape. For example, the electrode assembly 150 may be formed by winding, stacking or folding of the separator 140.

The electrode assembly 150 may be accommodated in a case, and may be accommodated together with an electrolyte in the case 160. The case 160 may include, e.g., a pouch, a can, etc.

In example embodiments, a non-aqueous electrolyte may be used as the electrolyte.

The non-aqueous electrolyte solution may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, difluoroethylacetate (DFEA), difluoropropylacetate (DFPA), fluoroethylacetate (FEA), etc. These may be used alone or in a combination of two or more therefrom.

As illustrated in FIG. 1, electrode tabs (a cathode tab and an anode tab) may protrude from the cathode current collector 105 and the anode current collector 125 included in each electrode cell to one side of the case 160. The electrode tabs may be welded together with the one side of the case 160 to be connected to an electrode lead (a cathode lead 107 and an anode lead 127) that may be extended or exposed to an outside of the case 160.

FIG. 1 illustrates that the cathode lead 107 and the anode lead 127 are positioned at the same side of the lithium secondary battery or the case 160, but the cathode lead 107 and the anode lead 127 may be formed at opposite sides to each other.

For example, the cathode lead 107 may be formed at one side of the case 160, and the anode lead 127 may be formed at the other side of the case 160.

The lithium secondary battery may be manufactured in, e.g., a cylindrical shape using a can, a square shape, a pouch shape or a coin shape.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Preparation Example 1

(1) Preparation of Mg-Doped Silicon-Based Active Material

Silicon (Si) and $SiO_2$ were mixed in a ratio of 1:1, and magnesium was mixed together with silicon and $SiO_2$ to form a mixture. The mixture was calcined at 1500° C. and then cooled to obtain a magnesium-containing silicon oxide composite. The silicon oxide composite was pulverized and classified to prepare a Mg-doped silicon-based active material. A carbon coating was formed on a surface of the silicon-based active material by a heat-treated CVD of ethylene at 900° C.

A pore volume ratio (porosity) of the silicon-based active material was adjusted by varying conditions of a magnesium doping amount, a heat treatment temperature during the doping and $Mg(OH)_2$ ratio in the preparation of the silicon oxide composite.

(2) Measurement of Particle Size Distribution (PSD)

A particle size distribution of the obtained silicon-based active material was calculated by dispersing a sample of the silicon-based active material in a dispersion medium (water dispersion of 10 wt % sodium hexametaphosphate ($(NaPO_3)_6$)), and then measuring a diffraction pattern difference according to a particle size by a laser diffraction particle size analyzer (Microtrac S3500).

In Table 1 below, a volume fraction of particles having a particle diameter of 2 μm or less was 15% or less in A-1 and A-2, and the volume fraction of particles having a particle diameter of 2 μm or less exceeded 15% in A-3.

(3) Measurement of Pore Volume Ratio (Porosity)

For the obtained silicon-based active material sample, a pore volume of pores having a diameter of 50 nm or less was measured by a BET method based on a nitrogen gas adsorption using a specific surface area measuring device (BEL-SORP-mino II).

The pore volume ratio was calculated as a percentage (%) of the measured pore volume divided relative to a total volume of the silicon-based active material sample. The total volume of the silicon-based active material sample was calculated by dividing a weight of the sample by a true density of the sample.

TABLE 1

| No. | silicon-based active material sample | | | | pore | | |
| --- | --- | --- | --- | --- | --- | --- | --- |
| | weight (g) | true density (g/cc) | volume (ml) | volume (ml/g) | (mm³/g) | (ml/g) | porosity (%) |
| A-1 | 3.5134 | 2.35 | 1.50 | 0.43 | 7.054 | 0.007 | 1.66 |
| A-2 | 3.7012 | 2.37 | 1.56 | 0.42 | 3.578 | 0.004 | 0.85 |
| A-3 | 3.7647 | 2.35 | 1.60 | 0.43 | 8.841 | 0.009 | 2.08 |

(4) Fabrication of Anode and Cathode

Anode compositions was prepared by mixing an anode active material, a conductive material (CNT), a binder (SBR) and a thickener (CMC) in the compositions and contents shown in Table 2 below. The anode composition was coated on a Cu foil, dried and pressed to form an anode having a loading amount of 9.35 mg/cm² (cross-section basis) and a mixture density of 1.7 g/cc.

A cathode slurry was prepared by mixing $LiNi_{0.88}Co_{0.08}Mn_{0.04}O_2$ as a cathode active material, CNT as a conductive material and polyvinylidene fluoride (PVDF) as a binder in a weight ratio of 98.18:0.6:0.12:1.1. The cathode slurry was coated on an aluminum substrate, dried and pressed to form a cathode.

(5) Fabrication of Secondary Battery

An electrode cell formed by disposing the prepared cathode and anode with a polyethylene (PE) separator (13 μm) interposed therebetween was stacked to form an electrode assembly. The electrode assembly was accommodated in a pouch and electrode tab portions were fused.

Thereafter, a 1.10M $LiPF_6$ solution was prepared using a mixed solvent of carbonate/ethylmethyl carbonate (EC/EMC, 25/75; volume ratio). A life-span additive (FEC) was added to the prepared solution to form an electrolyte in an amount of 6 wt % based on a total weight of the electrolyte. The electrolyte was injected into the pouch and then sealed to manufacture a secondary battery.

TABLE 2

| No. (weight parts) | silicon-based active material composition | silicon-based active material porosity(%) | carbon-based active material | conductive material | binder | thickener |
| --- | --- | --- | --- | --- | --- | --- |
| Example 1 | 6(A-1) 6(A-4) | 0.52 | 85.05 | 0.25 | 1.5 | 1.2 |
| Example 2 | 12(A-1) | 0.85 | 85.05 | 0.25 | 1.5 | 1.2 |
| Example 3 | 12(A-2) | 1.66 | 85.05 | 0.25 | 1.5 | 1.2 |
| Comparative Example 1 | 12(A-3) | 2.08 | 85.05 | 0.25 | 1.5 | 1.2 |
| Comparative Example 2 | 12(A-4) | 0.19 | 85.05 | 0.25 | 1.5 | 1.2 |

The specific components listed in Table 2 are as follows.

Silicon-Based Active Material

A-1 to A-3: the prepared Mg-doped silicon-based active material

A-4: Silicon oxide (SiOx, 0<x<2) (pore volume ratio: 0.19%)

Carbon-Based Active Material artificial graphite

Experimental Example 1

(1) Evaluation on Life-Span Property at Room Temperature

For the secondary batteries according to Examples and Comparative Examples, charging (CC/CV, 1/3C, 4.2V, cut-off 0.05C) and discharging (CC, 0.5C, 2.5V cut-off) at 25° C. were performed as one cycle, and the cycle was repeatedly performed with a 10-minute interval. Thereafter, a discharge capacity measured at the 500th cycle was expressed as a ratio (%) to a discharge capacity at the first cycle to obtain a capacity retention.

If the discharge capacity dropped rapidly before the 500 cycles and the discharge capacity at the 500th cycle could not be measured, the period when the sharp drop occurred was measured. The rapid life-span drop refers to a case where the capacity retention drops by 10% or more within 100 cycles.

(2) Evaluation on High-Temperature Life-Span Property

The secondary batteries according to Examples and Comparative Examples were charged (CC/CV, 1/3C, 4.2V, cut-off 0.05C) and discharged (CC, 0.5C, 2.5V cut-off) at 45° C. as one cycle. The cycle was repeatedly performed with a 10-minute interval. A capacity retention was measured as a percentage of a discharge capacity measured at the 700th cycle to a discharge capacity at the first cycle.

If the discharge capacity dropped rapidly before the 700 cycles and the discharge capacity at the 700th cycle could not be measured, the period when the sharp drop occurred was measured. The rapid life-span drop refers to a case where the capacity retention drops by 10% or more within 100 cycles.

The evaluation results are shown together in Table 3 below.

TABLE 3

| No. | life-span property at room temperature (@500 cycle) | | life-span property at high temperature (@700 cycle) | |
| --- | --- | --- | --- | --- |
| | life-span drop period (cycle) | capacity retention (%) | life-span drop period (cycle) | capacity retention (%) |
| Example 1 | — | 89.3 | — | 85.0 |
| Example 2 | — | 90.0 | — | 83.7 |
| Example 3 | — | 90.8 | — | 82.5 |
| Comparative Example 1 | — | 85.4 | 600 | — |
| Comparative Example 2 | — | 80.2 | — | 85.5 |

Referring to Table 3, in Comparative Example 1 where the silicon-based active material having a porosity of more than 2.0% was included, both room temperature life-span and high temperature life-span properties were deteriorated.

In Comparative Example 2 where the silicon-based active material that was not doped with magnesium was used, the life-span property at room temperature was deteriorated.

In Examples where the magnesium-doped silicon-based active material having a porosity of 2.0% or less was included, both high-temperature stability and room temperature life-span property were improved.

Preparation Example 2

(1) Preparation of Mg-Doped Silicon-Based Active Material

As described in Preparation Example 1, a silicon-based active material doped with Mg was prepared. In the grinding and classification process, a particle size distribution of the silicon-based active material was adjusted as shown in Table 4 below by varying a particle size of zirconia balls, a rotation speed and process time. In Table 4, the term "1 μm volume fraction" refers to a volume fraction of particles having a particle diameter of 1 μm or less, and the term "2 μm volume fraction" refers to a volume fraction of particles having a particle diameter of 2 μm or less.

A pore volume ratio was measured as described in Preparation Example 1, and pore volume ratios of A-5 to A-7 were measured to be 2.0% or less.

Additionally, the particle size distribution was measured as described in Preparation Example 1 above. In Table 4 below, Dmin refers to a minimum particle diameter. D10, D50 and D90 refer to particle diameters at 10%, 50% and 90% of a cumulative volume, respectively. Dmax refers to a maximum particle diameter.

TABLE 4

| No. | PSD(μm) | | | | | 1 μm volume fraction (%) | 2 μm volume fraction (%) | specific surface area (m²/g) |
|---|---|---|---|---|---|---|---|---|
| | Dmin | D10 | D50 | D90 | Dmax | | | |
| A-5 | 0.4 | 2.8 | 5.7 | 10.1 | 17.4 | 2.0 | 5.3 | 6.70 |
| A-6 | 0.3 | 1.7 | 5.5 | 10.2 | 17.4 | 4.5 | 11.0 | 9.24 |
| A-7 | 0.2 | 1.2 | 5.2 | 10.3 | 17.4 | 7.8 | 15.5 | 10.73 |

FIG. 3 is a graph showing a frequency-based volumetric particle size distribution of silicon-based active materials according to A-5 to A-7. FIG. 4 is a graph showing a volumetric cumulative particle size distribution of silicon-based active materials according to A-5 to A-7.

Referring to FIGS. 3 and 4, the curves according to A-5 to A-7 show similar profiles in a particle diameter region of D50 or more, but have different profiles in a particle diameter region of less than D50.

(2) Fabrication of Secondary Battery

As described in Preparation Example 1, an anode and a cathode were prepared and a secondary battery was assembled. When preparing the anode, mixtures having the composition and content as shown in Table 5 were prepared as anode compositions.

TABLE 5

| No. (weight parts) | silicon-based active material | | carbon-based active material | conductive material | binder | thickener |
|---|---|---|---|---|---|---|
| | composition | 2 μm volume fraction (%) | | | | |
| Example 4 | 8(A-5) | 4.50 | 89.05(B-1) | 0.25 | 1.5 | 1.2 |
| Example 5 | 4(A-5) 4(A-4) | 7.10 | 89.05(B-1) | 0.25 | 1.5 | 1.2 |
| Example 6 | 8(A-5) | 4.50 | 62.34(B-1) 26.71(B-2) | 0.25 | 1.5 | 1.2 |
| Example 7 | 8(A-6) | 11.0 | 89.05(B-1) | 0.25 | 1.5 | 1.2 |
| Comparative Example 3 | 8(A-7) | 15.50 | 89.05(B-1) | 0.25 | 1.5 | 1.2 |
| Comparative Example 4 | 8(A-5) | 4.50 | 89.05(B-2) | 0.25 | 1.5 | 1.2 |

The specific components listed in Table 5 are as follows.

Silicon-Based Active Material

A-4: silicon oxide (SiOx, 0<x<2)

A-5 to A-7: the above prepared Mg-doped silicon-based active material

Carbon-Based Active Material

B-1: artificial graphite

B-2: natural graphite

Experimental Example 2: Evaluation on Life-Span Property

Charge/discharge was performed by the same method as that in Experimental Example 1 to evaluate room temperature life-span and high temperature life-span properties. Specifically, 1000 cycles of charge and discharge were performed, and a capacity retention was measured by calculating a discharge capacity measured at the 1000th cycle as a ratio (%) to a discharge capacity at the first cycle.

If the discharge capacity dropped rapidly before the 1,000 cycles and the discharge capacity at the 1,000th cycle could not be measured, the period when the sharp drop occurred was measured. The rapid life-span drop refers to a case where the capacity retention drops by 10% or more within 1000 cycles.

The evaluation results are shown in Table 6 below.

TABLE 6

| No. | room temperature life-span (@1000 cycle) | | high temperature life-span (@1000 cycle) | |
|---|---|---|---|---|
| | life-span drop period (cycle) | capacity retention (%) | life-span drop period (cycle) | capacity retention (%) |
| Example 4 | — | 91.2 | — | 84.9 |
| Example 5 | — | 89.9 | — | 82.5 |
| Example 6 | — | 89.0 | — | 82.7 |
| Example 7 | — | 88.3 | — | 81.0 |
| Comparative Example 3 | 900 | — | 820 | — |
| Comparative Example 4 | 800 | — | 880 | — |

Referring to Table 6, in the silicon-based active material used in Comparative Example 3, a volume fraction of particles having a particle size of 2 μm or less exceeded 15%, and both room temperature life-span and high temperature life-span properties were deteriorated.

In Comparative Example 4 containing only natural graphite without artificial graphite, both room temperature life-span and high temperature stability were deteriorated.

In Example 6 where both artificial graphite and natural graphite were included and the content of artificial graphite was greater than that of natural graphite, high capacity retentions were obtained at room temperature and high temperature.

Preparation Example 3: Cathode Containing a Coating Layer

Example 8

A secondary battery was fabricated by the same method as that in Example 4, except that a coating layer was formed on the Cu foil prior to coating the anode composition when preparing the anode. Specifically, a composition for forming a coating layer was applied and dried on the Cu foil to form the coating layer, and then the anode composition was coated on the coating layer.

Compositions of the anode active material layer and the coating layer of Example 8 are shown in Table 7 below.

TABLE 7

|  | silicon-based active material | carbon-based active material | conductive material | binder | thickener |
|---|---|---|---|---|---|
| active material layer | 8(A-5) | 89.05(B-1) | 0.25 | 0.3 | 1.2 |
| coating layer | — | — | — | 1.20 | — |

Examples 9 and 10

A secondary battery was fabricated by the same method as that in Example 1, except that a coating layer was formed on the Cu foil prior to coating the anode composition when preparing the anode. Specifically, a composition for forming a coating layer was applied and dried on the Cu foil to form the coating layer, and then the anode composition was coated on the coating layer.

Compositions of the anode active material layer, the coating layer and the entire anode of Examples 9 and 10 are shown in Table 8 below.

TABLE 8

|  |  | silicon-based active material | carbon-based active material | conductive material | binder | thickener |
|---|---|---|---|---|---|---|
| Example 9 | active material layer | 12(A-1) | 85.95 | 0.25 | 0.60 | 1.2 |
|  | coating layer | 12(A-1) | 84.15 | 0.25 | 2.40 | 1.2 |
|  | average | 12(A-1) | 85.05 | 0.25 | 1.50 | 1.2 |
| Example 10 | active material layer | 6(A-1) 6(A-4) | 85.95 | 0.25 | 0.60 | 1.2 |
|  | coating layer | 6(A-1) 6(A-4) | 84.15 | 0.25 | 2.40 | 1.2 |
|  | average | 6(A-1) 6(A-4) | 85.05 | 0.25 | 1.50 | 1.2 |

Experimental Example 3: Rapid Charge Life-Span Property

For the secondary batteries prepared in Examples 4 and 8, 500 cycles of charging (SOC 80%, charging time: 35 minutes) and discharging (0.3C, SOC 8%) as one cycle were performed at 25° C. A graph of FIG. 5 was obtained by measuring a discharge capacity according to the number of cycles (# of cycle).

For the secondary batteries prepared in Examples 1, 2, 9 and 10, 300 cycles of charging (SOC 80%, charging time: 35 minutes) and discharging (0.3 C, SOC 8%) as one cycle were performed at 25° C. A graph of FIG. 6 was obtained by measuring a discharge capacity according to the number of cycles (# of cycle).

Figure 5:
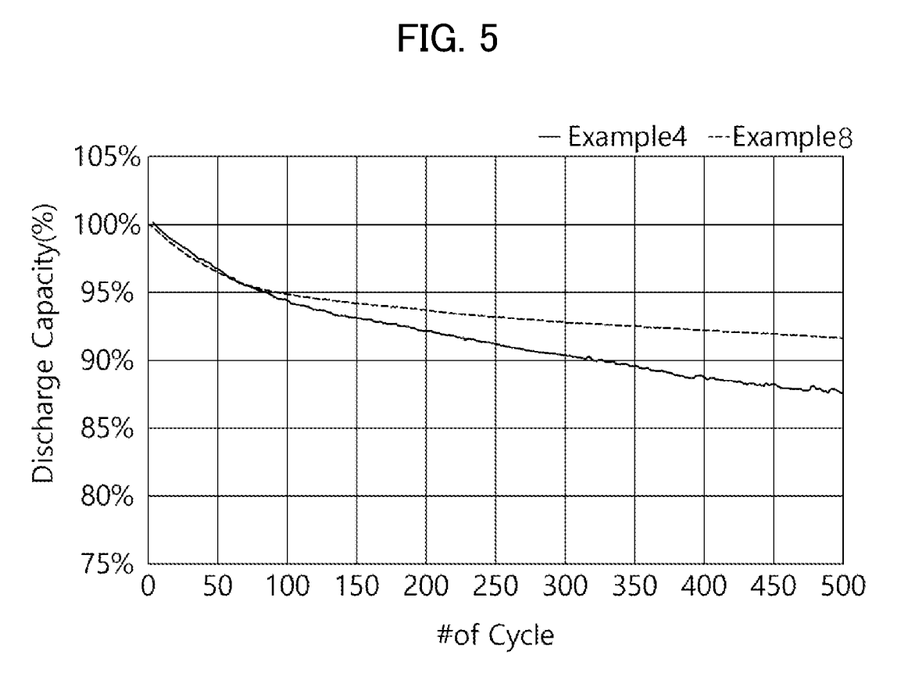
FIG. 5 is a graph showing rapid charge life-span properties of secondary batteries according to Examples 4 and 8.
Figure 6:
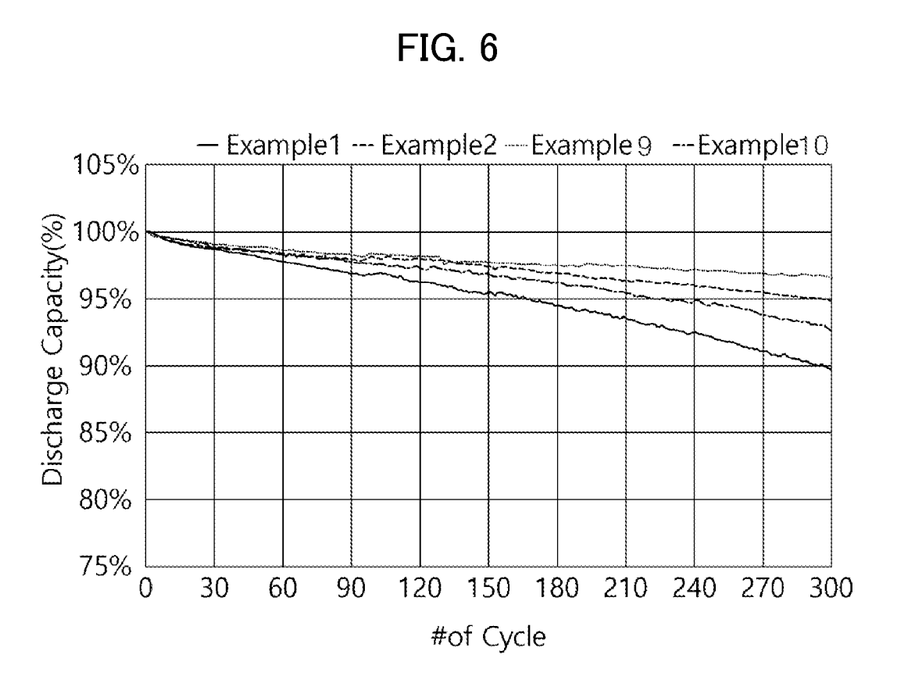
FIG. 6 is a graph showing rapid charge life-span properties of secondary batteries according to Examples 1, 2, 9, and 10.

Referring to FIG. 5, the rapid charge life-span property of Example 8 were further improved. Referring to FIG. 6, Example 9 provided more improved rapid charge life-span property than that in Example 2 having the same composition, and Example 10 has more improved rapid charge life-span property than that in Example 1 having the same composition.

What is claimed is:

1. An anode active material for a lithium secondary battery, comprising:
    a carbon-based active material including artificial graphite and natural graphite; and
    silicon-based active material particles doped with magnesium,
    wherein at least some of the silicon-based active material particles include pores, and a volume ratio of pores having a diameter of 50 nm or less among the pores is in a range from 0.2% to 2% based on a total volume of the silicon-based active material particles,
    wherein a specific surface area of the silicon-based active material particles is 10.5 m2/g or less,
    wherein a minimum particle diameter (Dmin) of the silicon-based active material particles is greater than 0.3 μm,
    wherein a ratio of the content of natural graphite relative to the content of artificial graphite is 0.5 or less, and
    wherein a volume fraction of particles having a particle diameter of 2 μm or less among the silicon-based active material particles is 5% or less.

2. The anode active material for a lithium secondary battery according to claim 1, wherein a content of magnesium doped in the silicon-based active material particles is greater than 0 wt % and less than 25 wt % based on a total weight of the silicon-based active material particles.

3. The anode active material for a lithium secondary battery according to claim 1, wherein the silicon-based active material particles further include a carbon coating.

4. The anode active material for a lithium secondary battery according to claim 1, wherein the silicon-based active material particles are further doped with at least one element selected from the group consisting of Li, Al, Ca, Fe, Ti, Zn, La, Ce, Sn, Zr and Ru.

5. The anode active material for a lithium secondary battery according to claim 1, wherein a Mg1s spectrum of the silicon-based active material particles measured by an X-ray photoelectron spectroscopy (XPS), a ratio of a peak area of 1303 eV relative to a sum of a peak area of 1304.5 eV and the peak area of 1303 eV is 0.6 or less.

6. The anode active material for a lithium secondary battery according to claim 1, wherein a content of magnesium hydroxide present on surfaces of the silicon-based active material particles is 0.05 wt % or less based on a total weight of the silicon-based active material particles.

7. The anode active material for a lithium secondary battery according to claim 1, wherein a content of the silicon-based active material particles is in a range from 0.1 wt % to 30 wt % based on a total weight of the anode active material.

8. The anode active material for a lithium secondary battery according to claim 1, wherein a content of the carbon-based active material is in a range from 60 wt % to 99 wt % based on a total weight of the anode active material.

9. An anode for a lithium secondary battery, comprising:
an anode current collector; and
an anode active material layer formed on the anode current collector, the anode active material layer comprising the anode active material according to claim 1.

10. The anode for a lithium secondary battery according to claim 9, further comprising a coating layer disposed between the anode current collector and the anode active material layer,
wherein the anode material layer and the coating layer each comprises a binder, and a content of the binder included in the coating layer is greater than a content of the binder included in the anode active material layer.

11. The anode for a lithium secondary battery according to claim 10, wherein the coating layer further comprises the anode active material.

12. A lithium secondary battery, comprising:
the anode for a lithium secondary battery according to claim 9; and
a cathode facing the anode for the lithium secondary battery.

13. The anode active material for a lithium secondary battery according to claim 1, wherein the carbon-based active material and the silicon-based active material particles are uniformly dispersed.

* * * * *